Sept. 6, 1932. K. G. WENNERSTROM 1,875,787
PROCESS OF MELTING OR HEATING MATERIAL IN AN ELECTRICAL FURNACE
Filed Aug. 19, 1929
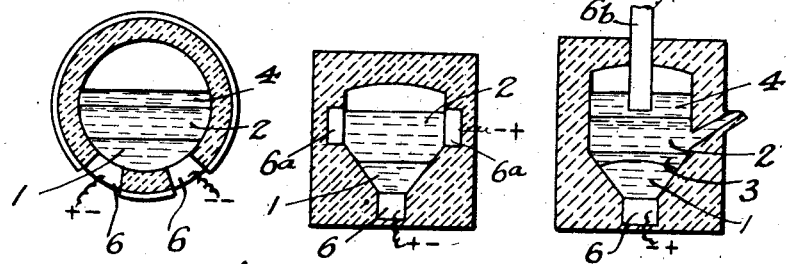
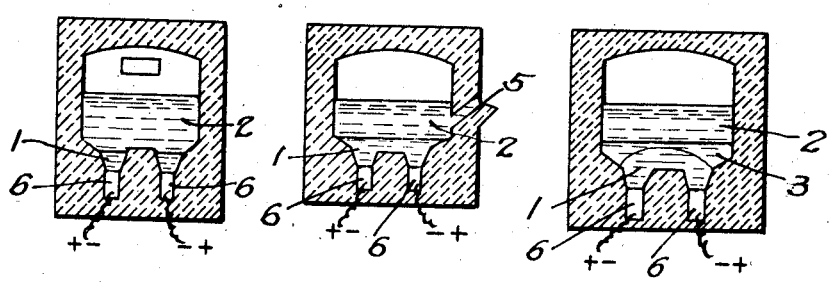
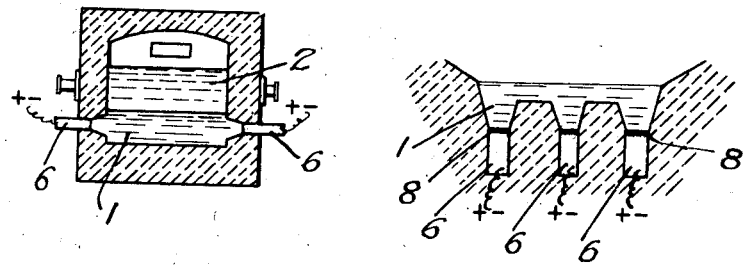
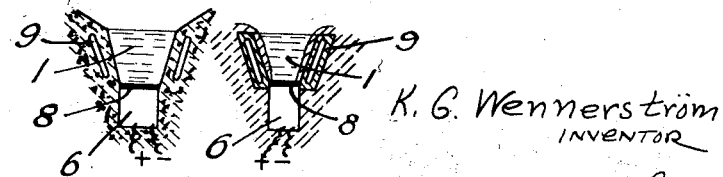
K. G. Wennerström
INVENTOR
By: Marks & Clerk
Attys.

Patented Sept. 6, 1932

1,875,787

UNITED STATES PATENT OFFICE

KARL GUSTAF WENNERSTROM, OF MALMKOPING, SWEDEN

PROCESS OF MELTING OR HEATING MATERIAL IN AN ELECTRICAL FURNACE

Application filed August 19, 1929, Serial No. 386,921, and in Sweden May 21, 1928.

This invention relates to a process for melting, or heating material in an electrical furnace, particularly melting of metals or metal alloys and a furnace for the carrying out of the said process.

In melting or other heating of metals or metal alloys in electrical furnaces slags of different composition are used in many cases, which slags arise by melting of the material or by melting of especially made additions. The quantity of slag thus covering the metal bath in the furnace is, however, comparatively small and, consequently, of a smaller depth. The tension generally used in electrical furnaces provided with vertical coal electrodes extending towards the bath surface is about 70-110 volt. On account of the small resistance, which the thin layer of slag offers to the electrical current, arcs are formed between the electrode and the slag—even if the electrode goes into the slag. A very high temperature is produced in these arcs, which in many cases has proved unsuitable for melting metals and obtaining a high quality. The metal bath becomes very overheated, and through the coal of the electrode or through the coal in the slag, carbide compounds are then very easily formed, which enter the metal bath. If for instance, in the presence of coal in melting of aluminium too high a temperature arises (about 1200° C.), aluminium carbide is at once formed, which reduces the quality of the product obtained. Even with a relatively deep layer of slag and with the use of such a tension as just mentioned the forming of arcs can not be avoided. Even the density of the current plays, at the transition of the current to the slag, an important part, because, if the density of the current is too great, the slag simultaneously with the forming of an arc comes in a strong inflation similar to cooking, which is accompanied by an undesirable overheating.

According to this invention said disadvantages are avoided, and at the same time the electrical energy may be utilized for the purpose in a technically and economically advantageous manner.

The invention is characterized in, that heat is supplied to the material with the help of a layer of slag solely heated by electrical resistance heating with the avoidance of the formation of an arc by using a suitable tension and density of the current and deep layer of slag.

The transmission of heat to the material may take place in different ways, either by the material coming into direct contact with the layer of slag or with a metal bath, which is heated by contact with the layer of slag, or also by radiation from the layer of slag or from such a metal bath as just mentioned.

In the accompanying drawing wherein several forms of furnaces suitable for carrying out the invention are illustrated:

Figs. 1-7 are vertical sectional views through furnaces of various forms.

Fig. 8 is a fragmentary detail of a further modification of the heating chamber of a furnace, and Figs. 9 and 10 are fragmentary detail sections of further modifications in which cooling devices are provided.

According to the invention heat is applied to the material by means of a layer of slag solely heated by electrical resistance heating under such conditions that the treated material during the entire treatment will be situated above the slag.

According to the embodiment shown in Fig. 1 the layer of slag 1 of suitable composition is allowed to form a bath of suitable depth and the metal 2 to be melted is then introduced into the furnace. The current supplied to the slag occurs through stationary electrodes 6 mounted in the wall of the furnace, at the bottom thereof. If the metal is lighter than the slag it will, on that account, form a liquid bath overlying the layer of slag. If desired, the meal bath may be covered by a top layer of slag designated at 4 forming a protection against oxidation.

According to the modification of the invention illustrated in Fig. 2 electrodes 6a are shown at the side walls of the furnace in contact with the metal bath 2, in addition to the electrodes 6 which are located in the bottom of the furnace.

In the modification of the invention illustrated in Fig. 3 electrodes 6 and 6b are shown as arranged to contact with the upper and lower layers of slag 1 and 3 and in accordance with this arrangement the greatest resistance is located in the bottom layer in order to produce a more intense heat at this point. When making heavy metals, a slag substantially lighter than the metal may be used, and in this case a tough crust 3 is formed on the layer of slag which will support the liquid metal. For this purpose a refractory silicate slag may be employed having a higher melting point than the metal bath 2 and which, on the surface presented to the metal bath, is solidified, while the slag mass lying underneath of the solid crust may be in liquid form and in electrically conducting relation with the electrodes. Although in solid form, it will be understood the slag can also at red heat be electrically conducting to a certain degree.

By employing a top layer of slag, as suggested in Fig. 3, the process may be advantageously employed for melting scrap iron and waste iron. If the scrap or waste iron containing oxide is melted in this way, the metal is purified from the oxide which is incorporated in the slag. In certain cases the oxide is reduced and the reduced metal becomes the bath. The waste product is negligible even when melting comminuted waste in the form of thin sheet or dust, for instance, from copper, brass or aluminum. The metal when added at once sinks in the slag bath so that oxidation of metal during the melting is prevented.

As illustrated in Fig. 4 the electrodes are preferably mounted in heating chambers which are preferably narrowed. The motion of the slag mass due to the heating thereof results in rapid distribution of the heat throughout the entire slag mass.

Melting of metal according to the invention can be carried on continuously, employing the same mass of slag. When the metal bath has attained a predetermined height in the furnace, part of the metal is drawn off while no part together with the slag is allowed to remain in the furnace, but melting being continued.

In the modification of the invention shown in Fig. 5, the furnace is provided with a drawing-off opening 5 which is partially filled with liquid metal at all times and which is so disposed as to prevent the slag from accompanying the metal, while the latter is being drawn off.

Fig. 6 illustrates a form of the invention in which the heating chambers containing an electrode 6 are narrowed and a trough crust 3 is formed on the molten slag 1, as in the embodiment shown in Fig. 3.

Figs. 7 and 8 illustrate several further modifications of heating chambers containing electrodes 6 and in the arrangement shown in Fig. 9 such electrodes are disposed in the side walls of the furnace.

In certain cases, for instance, for heating a mass of glass it is preferable, when using a bottom layer of slag and bottom electrode of coal or iron, to protect the bottom electrode against the influence of the slag by means of an intermediate molten layer of heavy metal designated at 8 in Figs. 8–10. The heavy metal employed may be lead or tin, for instance, and the arrangement is advantageous particularly in connection with the melting aluminum, the intermediate metal layer protecting the electrodes and preventing the formation of carbonic oxide.

In Figs. 9 and 10 which show further forms of narrowed heating chambers containing the electrodes 6 cooling devices 9 are also illustrated which are arranged in the walls of the chambers.

In producing alloys according to the invention which are specifically lighter than the layer of slag but which contain a metal which is heavier than said layer, the heavier metal is added to a part of the previously produced metal bath and is allowed to remain until it is alloyed with the previously molten metal.

Having now described my invention, what I claim as new and desire to secure by Letters Patent is:

1. A process of melting or heating material in an electric furnace with a layer of slag consisting in heating the layer of slag solely by electric resistance and thereby heating the material to be treated, and maintaining said material during the entire treatment above the layer of slag.

2. A process of melting or heating material in an electric furnace consisting in introducing slag which, at most, is of the same specific gravity as the material to be treated into the furnace and forming a tough crust on the slag upon which the molten metal rests.

3. In a process according to claim 2, the step of covering the molten bath with a layer of slag serving to prevent oxidation.

4. A process as claimed in claim 2 for producing alloys which are lighter than the underlying layer of slag but which contain a metal heavier than said layer, consisting in adding the heavier metal to a part of the previously prepared metal bath and allowing it to remain until it has had time to alloy itself with the previously molten metal.

In witness whereof I have hereunto signed my name.

KARL GUSTAF WENNERSTROM.